US006898671B2

(12) United States Patent
Ito et al.

(10) Patent No.: US 6,898,671 B2
(45) Date of Patent: May 24, 2005

(54) DATA PROCESSOR FOR REDUCING SET-ASSOCIATIVE CACHE ENERGY VIA SELECTIVE WAY PREDICTION

(75) Inventors: Masayuki Ito, Kodaira (JP); Junichi Nishimoto, Hachioji (JP)

(73) Assignee: Renesas Technology Corporation, Tokyo (JP)

( * ) Notice: Subject to any disclaimer, the term of this patent is extended or adjusted under 35 U.S.C. 154(b) by 484 days.

(21) Appl. No.: 10/083,342

(22) Filed: Feb. 27, 2002

(65) Prior Publication Data

US 2002/0161976 A1 Oct. 31, 2002

(30) Foreign Application Priority Data

Apr. 27, 2001 (JP) ........................................ 2001-130559

(51) Int. Cl.[7] ............................ G06F 12/12; G06F 9/28
(52) U.S. Cl. ...................................... 711/128; 711/213
(58) Field of Search ................................ 711/122, 128, 711/205, 213

(56) References Cited

U.S. PATENT DOCUMENTS

| | | | | |
|---|---|---|---|---|
| 5,845,323 | A | * 12/1998 | Roberts et al. | ............. 711/128 |
| 5,918,245 | A | * 6/1999 | Yung | ........................... 711/122 |
| 6,073,230 | A | * 6/2000 | Pickett et al. | ................ 712/205 |
| 6,356,990 | B1 | * 3/2002 | Aoki et al. | .................. 711/205 |
| 6,418,525 | B1 | * 7/2002 | Charney et al. | ............. 711/213 |
| 6,581,140 | B1 | * 6/2003 | Sullivan et al. | ............. 711/128 |
| 6,643,739 | B2 | * 11/2003 | Van De Waerdt et al. | .. 711/128 |

FOREIGN PATENT DOCUMENTS

JP          7-334423         6/1994

OTHER PUBLICATIONS

Michael D. Powell et al., "Reducing Set–Associative Cache Energy via Way–Prediction and Selective Direct–Mapping," Proceedigs of the 34th International Symposium on Microarchitecture (2001).

* cited by examiner

*Primary Examiner*—B. James Peikari
(74) *Attorney, Agent, or Firm*—Reed Smith LLP; Stanley P. Fisher, Esq.; Juan Carlos A. Marquez, Esq.

(57) ABSTRACT

The data processor has a set-associative cache memory capable of performing associative operation using tag information for an indexed cache line. The cache memory includes way prediction part for performing a selection of a way based on the prediction in parallel with the associative operation, generation part for generating way selection determining information based on the associative operation using the subsequent access address during a penalty cycle caused by a prediction miss of the way prediction part, and control part for making a way selected for the subsequent access address after the penalty cycle on the basis of the way selection determining information. Since a way to be hit at the subsequent cache access can be predetermined during the preceding penalty cycle, the cumulative number of penalty cycles can be reduced.

16 Claims, 13 Drawing Sheets

INDEX ADDRESS
INFORMATION

FIG. 5

| TIME | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CLOCK | | | | | | | | | | | | | | |
| CPU ADDRESS | R1 | R2 | R2 | R2 | R3 | R3 | R3 | R4 | R4 | R4 | R5 | R5 | R5 | |
| ADDRESS ARRAY ACCESS | R1 | | | R2 | | | R3 | | | R4 | | | R5 | |
| DATA ARRAY ACCESS | R1 | | R1 | R2 | | R2 | R3 | | R3 | R4 | | R4 | R5 | |
| HISTORY INFORMATION PREDICTED WAY | W0 | | W1 | W0 | | W1 | W0 | | W1 | W0 | | W1 | W0 | |
| WAY SELECTED | W0 | | W1 | W0 | | W1 | W0 | | W1 | W0 | | W1 | W0 | |
| LOCATION OF CPU REQUESTING DATA | W1 for R1 | | | W1 for R2 | | | W1 for R3 | | | W1 for R4 | | | W1 for R5 | |
| CPU RECEIVING DATA | W0 for R1 | | W1 for R1 | W0 for R2 | | W1 for R2 | W0 for R3 | | W1 for R3 | W0 for R4 | | W1 for R4 | W0 for R5 | |
| ACCESS STATE | R1 IS PREDICTION MISS | | | R2 IS PREDICTION MISS | | | R3 IS PREDICTION MISS | | | R4 IS PREDICTION MISS | | | R5 IS PREDICTION MISS | |
| EXTERNAL MEMORY ACCESS | | | | | | | | | | | | | | |

FIG. 6

| TIME | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CLOCK | | | | | | | | | | | | | | |
| CPU ADDRESS | R1 | R2 | R2 | R2 | R3 | R4 | R4 | R4 | R5 | | | | | |
| ADDRESS ARRAY ACCESS | R1 | (R2) | | (R2) | R3 | R4 | | (R4) | R5 | | | | | |
| DATA ARRAY ACCESS | R1 | | R1 | R2 | R3 | | R3 | R4 | R5 | | | | | |
| HISTORY INFORMATION PREDICTED WAY | W0 | W0 | W1 | W0 | W0 | W0 | W1 | W0 | W0 | | | | | |
| WAY SELECTED | W0 | | W1 | W1 | W0 | | W1 | W1 | W0 | | | | | |
| LOCATION OF CPU REQUESTING DATA | W1 for R1 | | | W1 for R2 | W1 for R3 | | | W1 for R4 | W1 for R5 | | | | | |
| CPU RECEIVING DATA | W0 for R1 | | W1 for R1 | W1 for R2 | W0 for R3 | | W1 for R3 | W1 for R4 | W0 for R5 | | | | | |
| ACCESS STATE | R1 IS PRE- DICTION MISS | | | R2 IS PRE- DICTION HIT | R3 IS PRE- DICTION MISS | | | R4 IS PRE- DICTION HIT | R5 IS PRE- DICTION MISS | | | | | |
| EXTERNAL MEMORY ACCESS | | | | | | | | | | | | | | |
| COMPLETION SIGNAL | 1 | 0 ※ | 0 | 1 | 1 | 0 | 0 ※ | 1 | 1 | | | | | |

FIG. 7

| TIME | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CLOCK | ⎍⎍⎍⎍⎍⎍⎍⎍⎍⎍⎍⎍⎍⎍ | | | | | | | | | | | | | |
| CPU ADDRESS | R1 | R2 | R2 | R2 | R2 | R2 | R3 | R3 | R3 | R4 | R4 | R4 | R4 | R5 |
| ADDRESS ARRAY ACCESS | R1 | | | | | R2 | | | R3 | | | | | R4 |
| DATA ARRAY ACCESS | R1 | | | | | R2 | | R2 | R3 | | | | | R4 |
| HISTORY INFORMATION PREDICTED WAY | W0 | | | | | W0 | | W1 | W0 | | | | | W0 |
| WAY SELECTED | W0 | | | | | W0 | | W1 | W0 | | | | | W0 |
| LOCATION OF CPU REQUESTING DATA | EXTERNAL MEMORY | | | | | W1 for R2 | | | EXTERNAL MEMORY | | | | | W1 for R2 |
| CPU RECEIVING DATA | W0 for R1 | | | | Data for R1 | W0 for R2 | | W1 for R2 | W0 for R3 | | | | Data for R3 | W0 for R4 |
| ACCESS STATE | R1 IS CACHE MISS | | | | | R2 IS PREDICTION MISS | | | R3 IS CACHE MISS | | | | | R4 IS PREDICTION MISS |
| EXTERNAL MEMORY ACCESS | | ISSUE R1 | | | | | | | | ISSUE R3 | | | | |

FIG. 8

| TIME | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CLOCK | | | | | | | | | | | | | | |
| CPU ADDRESS | R1 | R2 | R2 | R2 | R2 | R2 | R3 | R4 | R4 | R4 | R4 | R4 | | |
| ADDRESS ARRAY ACCESS | R1 | (R2) | | | | (R2) | R3 | R4 | | | | (R4) | | |
| DATA ARRAY ACCESS | R1 | | | | | R2 | R3 | | | | | R4 | | |
| HISTORY INFORMATION PREDICTED WAY | W0 | | | | | W0 | W0 | | | | | W0 | | |
| WAY SELECTED | W0 | | | | | W1 | W0 | | | | | W1 | | |
| LOCATION OF CPU REQUESTING DATA | EX-TERNAL MEMORY | | | | | W1 for R2 | EX-TERNAL MEMORY | | | | | W1 for R4 | | |
| CPU RECEIVING DATA | W0 for R1 | | | | Data for R1 | W1 for R2 | W0 for R3 | | | | Data for R1 | W1 for R4 | | |
| ACCESS STATE | R1 IS CACHE MISS | | | | | R2 IS PRE-DICTION HIT | R3 IS CACHE MISS | | | | | R4 IS PRE-DICTION HIT | | |
| EXTERNAL MEMORY ACCESS | ISSUE R1 | | | | | | | ISSUE R3 | | | | | | |
| 1 COMPLETION SIGNAL | 1 | 0 ※ | 0 | 0 | 0 | 1 | 1 | 0 ※ | 0 | 0 | 0 | 1 | 1 | |

FIG. 9

| TIME | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CLOCK | | | | | | | | | | | | | | |
| CPU ADDRESS | R1 | R2 | R2 | R2 | R3 | R3 | R3 | R3 | R3 | R4 | R4 | R4 | R5 | R5 |
| ADDRESS ARRAY ACCESS | R1 | | | R2 | | | | | R3 | | | R4 | | |
| DATA ARRAY ACCESS | R1 | | R1 | R2 | | | | | R3 | | R3 | R4 | | |
| HISTORY INFORMATION PREDICTED WAY | W0 | | W1 | W0 | | | | | W0 | | W1 | W0 | | |
| WAY SELECTED | W0 | | W1 | W0 | | | | | W0 | | W1 | W0 | | |
| LOCATION OF CPU REQUESTING DATA | W1 for R1 | | | EX- TERNAL MEMORY | | | | | W1 for R3 | | | EX- TERNAL MEMORY | | |
| CPU RECEIVING DATA | W0 for R1 | | W1 for R1 | W0 for R2 | | | | Data for R2 | W0 for R3 | | W1 for R3 | W0 for R4 | | |
| ACCESS STATE | R1 IS PRE- DICTION MISS | | | R2 IS CACHE MISS | | | | | R3 IS PRE- DICTION MISS | | | R4 IS CACHE MISS | | |
| EXTERNAL MEMORY ACCESS | | | | | ISSUE R2 | | | | | | | | ISSUE R4 | |

FIG. 10

| TIME | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CLOCK | ⎍⎍⎍⎍⎍⎍⎍⎍⎍⎍⎍⎍⎍⎍ | | | | | | | | | | | | | |
| CPU ADDRESS | R1 | R2 | R2 | R2 | R3 | R3 | R3 | R4 | R4 | R4 | R5 | R5 | R5 | |
| ADDRESS ARRAY ACCESS | R1 | (R2) | | R2 | | R3 | R4 | | R4 | | | R5 | | |
| DATA ARRAY ACCESS | R1 | | R1 | R2 | | | R3 | | R3 | R4 | | | R5 | |
| HISTORY INFORMATION PREDICTED WAY | W0 | | W1 | W0 | | | W0 | | W1 | W0 | | | | |
| WAY SELECTED | W0 | | W1 | W0 | | | W0 | | W1 | W0 | | | | |
| LOCATION OF CPU REQUESTING DATA | W1 for R1 | | | EX- TERNAL MEMORY | | | W1 for R3 | | | EX- TERNAL MEMORY | | | | |
| CPU RECEIVING DATA | W0 for R1 | W1 for R1 | W0 for R1 | | Data for R2 | W0 for R3 | | W1 for R1 | W0 for R4 | | Data for R4 | | | |
| ACCESS STATE | R1 IS PRE- DICTION MISS | | | R2 IS CACHE MISS | | | R3 IS PRE- DICTION MISS | | | R4 IS CACHE MISS | | | | |
| EXTERNAL MEMORY ACCESS | | | ISSUE R2 | | | | | | | ISSUE R4 | | | | |
| COMPLETION SIGNAL | 1 | 0 | 0 | 1 | 0 | 0 | 1 | 0 | 0 | 1 | 0 | 0 | 1 | |
| | | ※ | | | ※ | | | ※ | | | ※ | | | |

DATA PROCESSOR FOR REDUCING SET-ASSOCIATIVE CACHE ENERGY VIA SELECTIVE WAY PREDICTION

BACKGROUND OF THE INVENTION

The present invention relates to a data processing device or data processor such as a micro-processor with a cache memory or a DSP (Digital Signal Processor), and in particular to a technique effectively applied to a cache control technique using a way predicting function.

In the data processing device such as a microprocessor or a DSP, an on-chip cache memory capable of high-speed operation is generally mounted to minimize the amount of data transfer from the processor to an external memory and improve performance. This configuration enables the processor to hide an access cycle to the external memory when a hit occurs in the cache memory, and hence achieve high performance. From the viewpoint of power consumption, the processor can also reduce the power requirements for memory control, though the cache memory itself consumes power, because of no need to drive an external input/output pin or an external input/output buffer circuit. Thus the use of such a cache memory can contribute to lower power consumption for the entire processor.

To form a cache memory, there are mapping methods for bringing external memory data into correspondence with data in the cache on a fixed block basis. The mapping methods include a direct mapping method, a set associative method and a full associative method.

Here, if the size of a block is B bytes and the number of blocks is "c," a block number "m" including the bytes of an external memory address a will be an integral number part of "a/B."

In the direct mapping method, the block of the external memory with the number "m" is uniquely mapped to a block in the cache memory with a number represented by a modulo operational expression "m mod c." In the direct mapping, if plural blocks possibly allocated to the same block in the cache are used at the same time, a collision will occur and the cache hit rate will be reduced. In contrast, the full associative method is to map any block in the external memory to any block in the cache memory. However, in the full associative method, associative retrieval needs to be performed for all the blocks at each access, which is hard to realize in a practical cache capacity. Therefore, the set associative method that is in-between of both is generally put to practical use. In the set associative method, a unit of n (N=2, 4, 8 or so) blocks in the cache is defined as a set, and to this set the direct mapping method is applied while to the blocks in the set the full associative mapping is applied so that the merits of both methods will be used. By the value n, this method is called an n way set associative method.

From the viewpoint of access time, the set associative method, however, is inferior to the direct mapping method. Generally speaking, one line (one cache entry) of the cache consists of a tag indicating an address stored in the cache and stored data, and which block (way) data in the set should be read out depends on a result of comparison between the access address and the tag. In the direct mapping method, since data to be read out is uniquely determined by the access address, the direct mapping method is the most advantageous for the time required to read out the cache.

The direct mapping method is the most advantageous in terms of power consumption as well. This is because the set associative method is required not only to read out the tags of all the blocks (ways) in the set, but also to determine or confirm the readout data at a high speed, which generally needs to perform control for reading out data of all the way candidates without waiting for a decision of a hit way.

There is another method, called a way-predictive set-associative method, which can enjoy the merits of both the direct mapping method and the set associative method as described above, that is, high performance resulting from a high cache hit rate of the set associative method and a speedup resulting from the fact that the direct mapping method can perform cache retrieval at each access in a short time.

In the way-predictive set-associative method, since the read-out data can be determined or confirmed without waiting for the decision of a hit way by predicting a unique way with a reference line existing thereon independently of the tag comparison, high-speed reading in the direct mapping method can be performed while achieving a high hit rate in the set associative method. An example of this kind of way-predictive set-associative method is described in JP-A-07-334423.

SUMMARY OF THE INVENTION

In the above-mentioned way-predictive set-associative method, there is a case where a predicted way is misjudged despite the occurrence of a cache hit, in addition to normal cache hit and miss. This misjudgment is called a prediction miss. In this method, there are the following three states: (1) a prediction hit (where a normal cache hit occurs and the way prediction is correct); (2) a prediction miss (where a normal cache hit occurs but the way prediction is wrong); and (3) a cache miss (where a normal cache miss occurs to cause a cache replacement).

An execute cycle of a prediction hit is usually one cycle while an execute cycle of a cache miss is determined by the access time to the external memory, which are the same as those in the direct mapping method or conventional set associative method. When a prediction miss occurs, a penalty cycle is caused because of the need to re-access a correct way in the case of a read access. In general, the processor that operates at a high speed uses a pipeline configuration in which a cache control part operates on the assumption that way prediction is hit so that it can process continuous accesses appearing one after another. Therefore, in an execute cycle following a cycle in which a way prediction miss occurs, the processor starts control for performing the next access processing. Because of this processing control, a re-access to a correct way is delayed to the further next cycle, which results in insertion of two or more penalty cycles at the time of occurrence of a prediction miss. Suppose further that in the case of a write access, writing is speculatively performed according to the way prediction. In this case, when a prediction miss occurs, original correct data need to be recovered for all the ways to which writing has already been done, that is, they need to be rewritten onto correct ways.

The inventors have further studied the penalty cycle caused by a prediction miss. For example, when a prediction miss occurs during continuous read accesses, the cache memory executes the penalty cycle in a normal associative operation, while the CPU stalls an execute cycle following the execute cycle (or memory access cycle) related to the prediction miss concerned to keep succeeding processing in a wait state. During the wait state, the cache memory is just executing the penalty cycle to the access related to the prediction miss. From this point of view, the inventors found that if consecutive prediction misses occurred to consecutive accesses, the penalty cycle would be accumulated every time a prediction miss occurred, and the CPU would remarkably delay the memory access. Even when the cache miss and the prediction miss occur almost simultaneously, the penalty cycle is accumulated in the same way every time a respective miss occurred.

It is an object of the present invention to provide a data processing device or data processor which can reduce the number of cumulative penalty cycles caused when the above-mentioned prediction misses consecutively occur or the cache miss and the prediction miss occur almost simultaneously, which results in a contribution to an improvement in data processing performance or data processing speed of a CPU or the like.

[1] The first aspect of the present invention for "preventing occurrence of consecutive way prediction misses" is to predetermine a way of an access following a prediction miss in order to prevent occurrence of consecutive way prediction misses. In this aspect of the present invention, a data processing device has a set-associative cache memory capable of performing associative operation using tag information for an indexed cache line. The cache memory comprises: way prediction means (13) for performing way selection based on the prediction in parallel with the associative operation; generation means (30) for generating way selection determining information based on the associative operation using the subsequent access address during a penalty cycle caused by a prediction miss of the way prediction means; and control means (31, 31A) for making a way selected for the subsequent access address after the penalty cycle on the basis of the way selection determining information.

The associative operation is, for example, an operation in which predetermined access addresses are compared with tag information contained in respective ways of the indexed cache line to generate an association result signal which indicates an association hit or association miss on a way basis.

The prediction performed by the way prediction means is, for example, processing for determining the least recently selected way as a selected way on the basis of history information indicative of way selections for each cache line.

The control means (31) is to make a selection of a way based on the way selection determining information instead of the prediction performed by said way prediction means. Alternatively, the control means (31A) controls rewriting of prediction result information of the way prediction means, the prediction result information corresponding to the way selection determining information.

In the data processing device, if the CPU performs continuous reading of accesses, the tag information for the indexed cache line is compared with an access address from the CPU at the first read access to judge from the comparison result whether it is a cache hit or cache miss. The judgment result is held in the control means. In parallel with this judgment, a way selection (way predictive selection) is made according to an algorithm using the history information, and data on the selected way is given to the CPU as read data. The control means can recognize whether the way prediction was correct based on the result of the judgment on the presence of a cache hit or cache miss. For example, the control means recognizes whether a way related to a cache hit matches way prediction based on the history information. When the way prediction is correct, the cache operation responding to the first read access is completed, which allows processing for the subsequent second read access in the next cycle. If a cache miss occurs, the cache entry will need to be replaced by accessing an external memory in the same manner as in the conventional direct mapping or set associative method. In this case, of course, the CPU is informed that the processing for the first read access has not been completed yet until normal read data is supplied to the CPU after the completion of necessary processing such as the replacement. Even if it is a cache hit, incorrect way prediction will make it difficult in time to switch the next cycle of the cache memory designed to operate at a high speed to a cycle of re-access to a correct way for the first read access. As a result, the address information and the like for the second read access are transmitted from the CPU to the cache memory in the next cycle concerned. At this time, the cache memory makes an address array operate as it is to compare a tag output from the address array with the address of the second read access from the CPU. The control means stores the comparison result as the result of comparison between the second read access from the CPU and each way so that the comparison result will be available from then on. In this stage, since the CPU has not completed processing for the first read access yet, data from the data array is read out again in the next cycle using the address of the first read access. For the read-out data, the control means can select an access way directly using the result of comparison between the tag and the address previously obtained and stored for the first read access. By directly using this comparison result, instead of the selection of an access way, the history information for a corresponding cache line is first updated beforehand so that the way concerned will be a predictive selection target using the comparison result. Since this assures a hit of way prediction for the re-access without fail, the way selection using the history information may also be made for the re-access of the first read access. Thus the processing for the first read access is always completed in this cycle, and the second access is processed in the next cycle. In the processing for the second read access following the prediction miss at the first read access, since the control means has already stored the result of comparison between the address of the second read access and the tag, use of the already obtained comparison result, instead of way prediction according to the algorithm using the history information, makes it possible to select an absolutely correct access way and supply the data to the CPU, regardless of the contents of prediction for the second read access. Therefore, there is no room for occurrence of any penalty cycle for the second read access related to a cache hit.

As stated above, when processing consecutive read accesses from the CPU, the data processing device obtains and stores the way selection determining information related to a way to be hit at the subsequent read access beforehand during a penalty cycle required when a way prediction miss occurs at the first read access so that the way selection determining information will be used to select a way for the second read access. This makes it possible to prevent consecutive way prediction misses, and hence enables the way-predictive set-associative cache memory to maintain cache hit performance of the set associative method while operating at a high speed in the same manner as in the direct mapping method.

Although the above description of the operation took the read access as an example, the access is not particularly limited to the read access, and it may be other access like a write access.

[2] The second aspect of the present invention for "determining a way of an access following a cache miss" is to predetermine an access way for the access following the cache miss in order to prevent occurrence of a way prediction miss following the cache miss. In other words, an access miss is not limited to the way prediction miss for the above-mentioned first read access, and the access miss may be a cache miss or the like as long as it causes a penalty cycle. In this aspect of the present invention, the data processing device is a data processing device having a set-associative cache memory capable of performing associative operation using tag information for an indexed cache line. The cache memory comprises: way prediction means for making a way selection based on the prediction in parallel with the associative operation; generation means for generating way selection determining information based on the associative operation using the subsequent access address; and control means for making a way selected for the subsequent access address after the penalty cycle on the basis of the way selection determining information.

[3] The third aspect of the present invention for "pre-issuing an external access instruction responding to a cache miss of an access following a way prediction miss" is to pre-issue the external access instruction responding to the cache miss of the access following the way prediction miss. In other words, it is assumed here that a cache miss occurs to an access like the above-mentioned second read access. In this aspect of the present invention, a data processing device has a set-associative cache memory capable of performing associative operation using tag information for an indexed cache line. The cache memory comprises: way prediction means for making a way selection based on the prediction in parallel with the associative operation; and control means for issuing an instruction to an external memory access responding to a cache miss of the subsequent access address during a penalty cycle caused by a prediction miss of the way prediction means. In this configuration, when the access following the way prediction miss is a cache miss, the cache miss can be detected quickly to activate the external memory access right away.

[4] In the fourth aspect of the present invention for "selecting a way predicting function", a data processing device adopts a cache memory comprising: control means for making a way selection according to the result of the above-mentioned associative operation; way prediction means for making a way selection based on the prediction in parallel with the associative operation; and selection means for switchably selecting either of the control means or the way prediction means for way prediction. In other words, it adopts a cache memory including instruction means for switchably instructing either of a first operation mode for making a way selection according to the result of the above-mentioned associative operation and a second operation mode for making a way selection based on the prediction in parallel with the associative operation. In this configuration, if the instruction means is register means accessible by a built-in CPU, the operation modes of the cache memory can be set via CPU software.

[5] In the other aspect of the present invention, a data processor has a set-associative cache memory capable of performing associative operation using tag information for an indexed cache line and a CPU connected to the cache memory, both of which are formed on a semiconductor substrate, for example. The cache memory comprises a plurality of way and cache control means. The cache control means makes a way selection based on the prediction in parallel with the associative operation in response to the access operation of the CPU, generates way selection determining information during a penalty cycle caused by a prediction miss, in which a predictively selected way does not match the result of the associative operation, on the basis of a retrieval hit resulting from the associative operation using the subsequent access address, and performs control for making a way selected for the subsequent access address after the penalty cycle on the basis of the way selection determining information instead of the way selection based on the prediction. The control means may control the rewriting of prediction result information obtained by the way prediction means and corresponding to the way selection determining information.

The cache control means may be configured to issue an instruction to a memory controller or bus state controller to access an external memory for a cache miss of the subsequent access during the penalty cycle caused by the prediction miss.

The cache control means, for example, has storage means for storing way selection history information on a cache line basis, and the history information is information for determining a way corresponding to the least recently accessed information as a selected way.

The cache control means is to update the history information so that the latest access way selected from the indexed cache line can be specified in a prediction process to be performed later.

The cache control means is to read out the history information from the storage means according to the address information for indexing the cache line to perform a predictive selection of a way based on the read-out history information.

The cache control means judges, on the basis of the tag information contained in the indexed cache line, whether a cache miss or prediction miss occurs in the way selection process, reselects a way in response to a cache hit and the judgment result of a prediction miss while updating the history information corresponding to the cache line to be accessed, and instructs an external access in response to the judgment result of the prediction miss so that the cache line to be accessed will be replaced while updating the history information corresponding to the cache line to be replaced.

The above and other objects and novel features of the present invention will become apparent from the following detailed description and the accompanying drawings.

BRIEF DESCRIPTION OF THE DRAWINGS

FIG. 5 is a timing chart illustrating the operation of a cache memory which has a way predicting function but does not have a way selection determining function;

FIG. 6 is a timing chart illustrating the operation when prediction determination information is used in the data processor of FIG. 1;

FIG. 7 is a timing chart illustrating the operation of another cache memory which has the way predicting function but does not have the way selection determining function;

FIG. 8 is a timing chart illustrating the operation in another case where another prediction determination information is used in the data processor of FIG. 1;

FIG. 9 is a timing chart illustrating the operation of still another cache memory which has the way predicting function but does not have the way selection determining function;

FIG. 10 is a timing chart illustrating the operation in still another case of the data processor of FIG. 1;

DETAILED DESCRIPTION OF THE EMBODIMENTS

Figure 1:
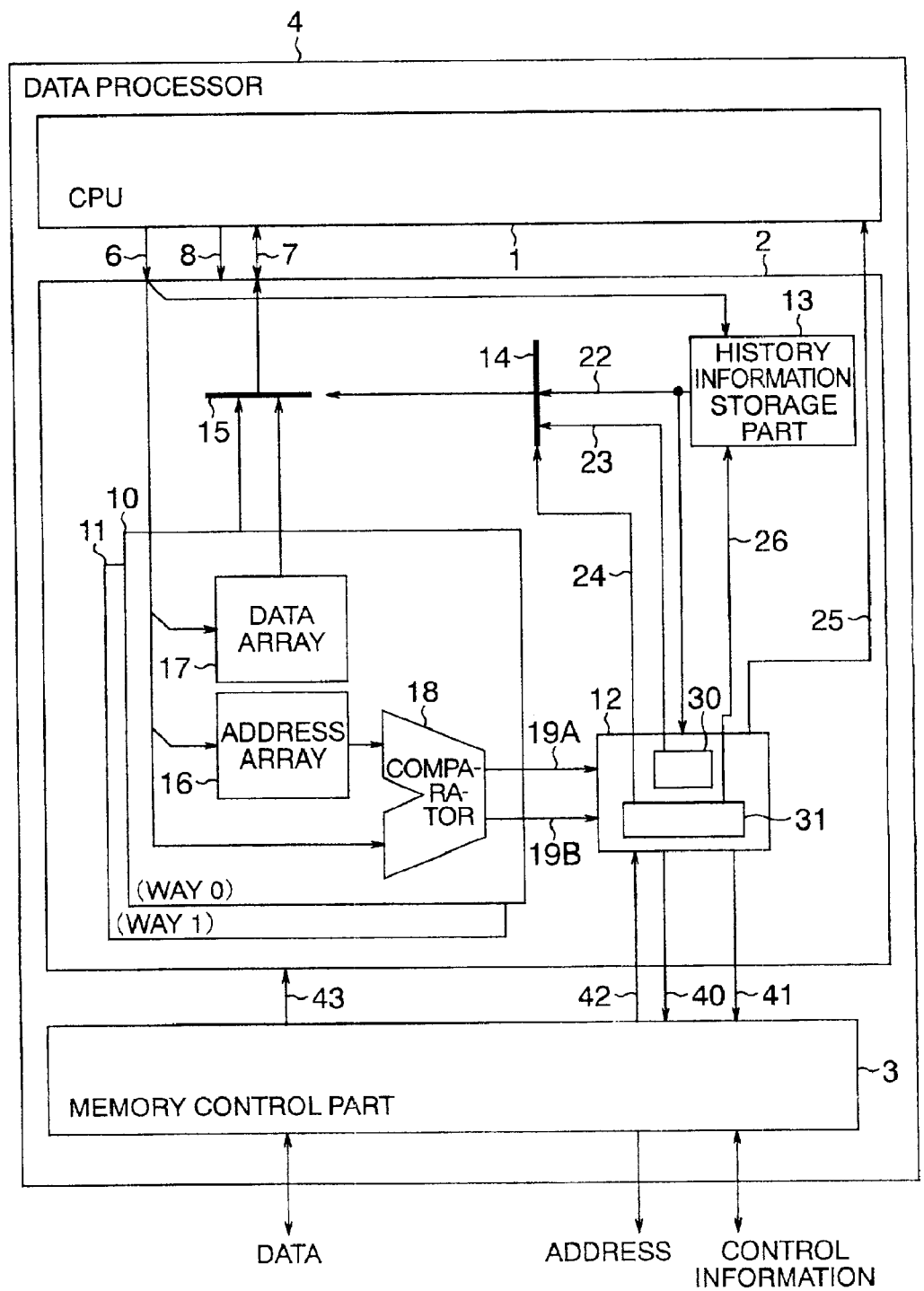
FIG. 1 is a block diagram showing an example of a data processor according to the invention.

FIG. 1 shows an example of a data process according to the invention. As shown, a data processor 4, though not limited thereto, is formed on a semiconductor substrate (semiconductor chip) made of single crystal silicon or the like using a CMOS integrated circuit manufacturing technique or the like. The data processor 4 includes a CPU (central processing unit) 1, a cache part 2 and a memory control part 3.

The CPU 1 includes a command control part for decoding a fetched command to generate a control signal, and an execution part for performing computations under the control of the command control part. Reference numeral 6 designates an address bus, 7 is a data bus, and 8 is a control bus. The CPU 1 is connected to the cache part 2 through these buses 6 to 8. When the CPU 1 performs a memory access, an effective address is outputted to the address bus 6. A strobe signal such as a read or write signal is outputted to the control bus 8. The CPU 1 is supplied with read data through the data bus 7, while it outputs the write data to the data bus 7.

The cache part 2 is constituted as a two-way set-associative cache memory with a way predicting function. The constitution of the cache part 2 shown in the FIG. 1 is illustrated mostly to show the part for responding to read accesses from the CPU 1 with omitting the details of data paths to the CPU 1 at write accesses.

The cache part 2 includes two ways 10, 11, a cache control part 12, a history information storage part 13, and selectors 14, 15.

The way 10 includes an address array 16, a data array 17 and a comparator 18. The address array 16 and the data array 17 each have a cache line for inputting part of a lower side of an address signal supplied from the address bus 6 commonly as an index address signal so that the cache line will be used as an information storage area to be selected by the index address signal. In the respective cache line, though not limited to the following principle, data information is stored on the data array 17 side and tag information and the like are stored on the address array 16 side. The comparator 18 compares the index tag information of the indexed cache line with tag information corresponding to that of the address signal as the access address information to generate an association result signal 19A indicative of an associative hit or miss. The way 11 includes an address array, a data array and a comparator, not shown, corresponding to those of the way 10, in which the comparator, not shown, compares the tag information of the indexed cache line with tag address information corresponding to that of the address signal to generate an association result signal 19B indicative of an association hit or miss. The operation that compares the tag address information contained in the access address information with tag information on each way of the indexed cache line to generate either of the associative result signals 19A, 19B indicative of an associative hit or miss on a way basis is called here the associative operation.

The selector 15 selects data output from the data array 17 of the way 10 or 11. The selector 14 selects either a way prediction signal 22 outputted from the history information storage part 13 as a selection control signal for the selector 15 or a way determining signal 23 outputted from the cache control part 12. A selection signal 24 for the selector 14 is outputted by the cache control part 12. It should be noted that if the number of bits (for example, 128 bits) for the length of a data word to be selected by the sector 15 exceeds an access unit like in the case of a long word (32 bits), the number of lower order bits on the least significant bit side of the address signal (for example, four bits in the case of a byte address) may be used at another selector, not shown, to select the 32 bits.

The history information storage part 13 holds way selection history information (matching ways selected via associative operation) on a cache line basis which may be stored, for example, in a Hit-Way History Table, so that the history information will be selected by the index address signal in response to the indexing operation of the cache line. Since it is two-way in this example, the history information contains just one bit to generate the way prediction signal 22 from the history information selected by the index address. The way prediction signal 22 is a signal, which represents the least recently selected way for the corresponding cache line.

In FIG. 1, the cache control part 12 judges, on the basis of the tag information contained in the indexed cache line, whether a cache miss or prediction miss for the way selection occurred. The cache miss means that either of the association result signals 19A, 19B is judged to show disagreement in the comparison process. The cache hit means that either of the association result signals 19A, 19B is judged to show agreement in the comparison process. The prediction miss indicates a state in which the way related to the cache hit disagrees with the way represented by the way prediction signal 22. The other state in which both agree with each other is the prediction hit.

When the result of the judgment by the cache control part 12 is the prediction hit, the cache operation then is regarded as being normally completed, and the caches control part 12 activates an access completion signal 25 to return the same to the CPU 1. In response to the activation of the access completion signal 25, the CPU 1 recognizes the data on the data bus 7 as an access data. In other words, the access completion signal 25 functions as a data strobe signal for the CPU 1.

An abnormal completion of the cache operation occurs in the case of the prediction miss or cache miss. In general, since the data processor operating at a high speed adopts a pipeline configuration to process consecutive cache accesses one by one, the cache control part 12 operates on the assumption that the way prediction is hit without fail. Therefore, the CPU 1 may start outputting an address for the next execute cycle regardless of whether a way prediction miss or cache miss occurs. In other words, the CPU overruns to the next operation. After that, the CPU 1 keeps the access operation in a wait state and restarts its control operation when the access completion signal 25 is asserted after the completion of the penalty cycle related to the access miss operation.

The cache control part 12 reselects, in its data array, a way related to a cache hit in the associative operation in such a penalty cycle as to respond to the judgment result of a prediction miss, for example. In addition, the cache control part 12 updates the history information corresponding to the indexed cache line into history update data 26 in which the way reselected is given the highest prediction priority. For example, when the way 10 is predicted in the predictive operation, and the way 11 is selected in the associative operation, the history information for the cache line concerned is updated into the history update data 26 in which the way prediction signal 22 indicates the way 11. In this reselection operation, that is, in the penalty cycle, the way 10 and 11 concurrently perform the associative operation for the next access address given by an overrun operation of the CPU 1. If the associative operation performed concurrently results in a cache hit, the association result is held in a way determination generating part 30 as the way selection determining information 23 for the subsequent access. The way selection determining information 23 held in the way determination generating part 30 is selected at the selector 14 instead of the way prediction signal 22 in response to the access following the penalty cycle. The selection operation of the selector 14 is performed by a control circuit 31 using the signal 24. Selection timing of the way selection determining information 23 using the signal 24, though not limited to the following principle, is the second cycle from the operation cycle in which the way prediction miss occurred.

Thus, when processing consecutive accesses from the CPU 1, if a way prediction miss, for example, at the first read access occurs, the cache control part 12 obtains and prestores the way selection determining information 23 indicative of a way to be hit by the subsequent read access to use it for a way selection at the second read access, which makes it possible to prevent a continuous way miss securely.

Further, the cache control part 12 gives an access control signal 40 and an address signal 41 to the memory control part 3 to instruct the same to access the external memory so as to replace the cache line to be accessed in response to the judgment result of the cache miss while updating the history information corresponding to the cache line to be replaced. During this operation, the cache control part 12 holds the way selection determining information 23 in the way determination generating part 30 in the same way as in the case of the prediction miss. Then the control part 31 controls the selector 14 to select the way selection determining information 23 instead of the way prediction signal 22 in response to the access of the cache hit following the penalty cycle related to the cache miss, thereby preventing the way prediction miss following the cache miss. Selection timing of the way selection determining information 23 using the signal 24, though not limited to the following principle, is the fifth cycle from the operation cycle in which the cache miss occurred. It should be noted that data 43 obtained from the outside in the penalty cycle related to the cache miss is stored on the cache line related to the cache miss via the process of predetermined replacement control.

Further, during the penalty cycle related to the prediction miss, the cache control part 12 judges whether it is a cache miss on the basis of prediction result signals 19A, 19B for the subsequent access address. Then, if it is judged that a cache miss occurred, the cache control part 12 pre-issues to the memory control part 3 an instruction of an external memory access in response to the cache miss.

Figure 2:
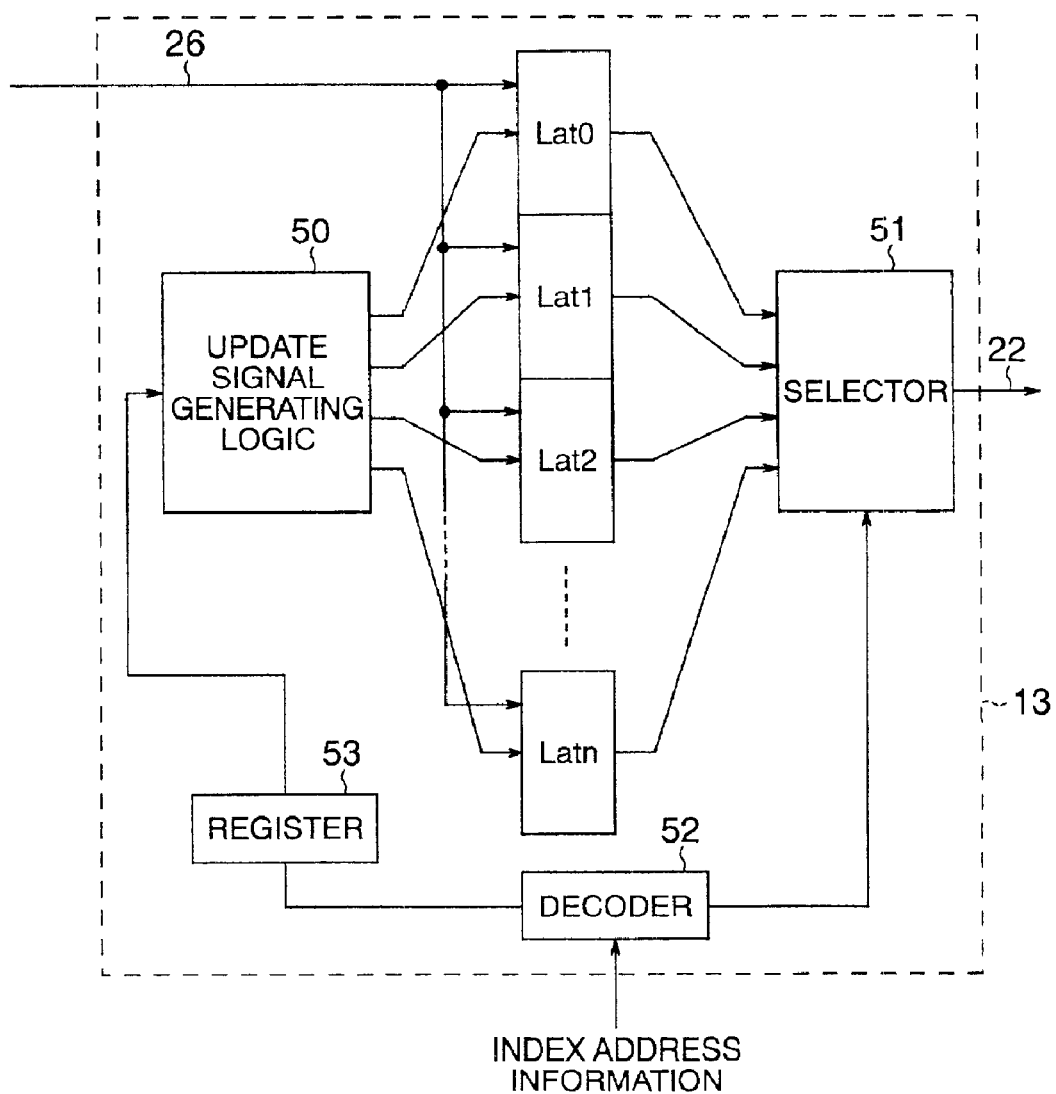
FIG. 2 is a block diagram illustrating a schematic configuration of a history information storage part.

FIG. 2 illustrates a schematic configuration of the history information storage part 13, in which Lat 0~Lat n are latch circuits for holding the history information in one-to-one correspondence with the cache lines. Write data for each of the latch circuits Lat 0 to Lat n is created as the history update data 26 and each update signal is generated at an update signal generating logic 50. The output data from the latch circuits Lat 0 to Lat n are selected at a selector 50. The selection operation of the selector 51 is determined by a decode signal from a decoder 52 for decoding the index address signal. Since the writing of the history information is performed in an operation cycle subsequent to the cycle in which the indexed address is supplied, a register 53 is arranged on the written update signal generating logic 50 side. The update signal generating logic 50 inputs a latch timing signal, not shown, to give the latch circuits Lat 0 to Lat n the decode signal held in the register 53 in synchronism with the latch timing instructed therefrom.

Figure 3:
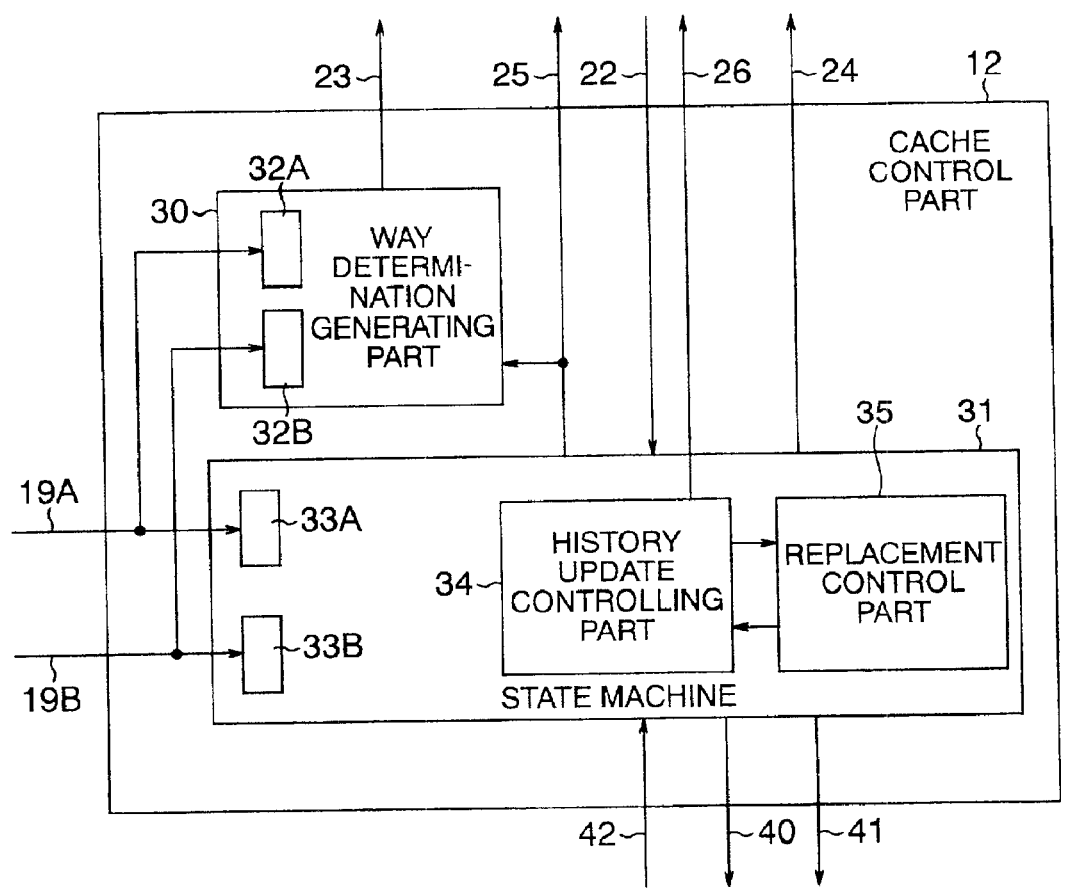
FIG. 3 is a block diagram illustrating the details of a cache control part.

FIG. 3 illustrates the details of the cache control part 12. The cache control part 12 is roughly divided into the way determination generating part 30 and a state transition controlling part (state machine) 31 as the other control part. In the way determination generating part 30, latch circuits 32A, 32B for latching the association result signals 19A, 19 are representatively shown in the drawing, indicating input of the access completion signal 25 and output of the way determining signal 23 from and to the CPU. The latch circuits 32A, 32B perform the latch operation in a cycle two cycles later than a cycle in which the access completion signal 25 is negated from a high level to a low level. In other words, since the access complete signal 25 is negated from the access starting point, the latch operation is performed at such timing as to take in an address for the subsequent access in a cycle following the cycle in which the miss occurred. This state is positioned and further described as latch timing of the latch circuits 32A, 32B in cycles indicated with an asterisk (*) in the row of the "completion signal" in FIGS. 6, 8 and 10 to be described later.

In the state machine 31, latch circuits 33A, 33B for latching the association result signal 19A, 19B, a history update controlling part 34 and a replacement control means 35 are representatively shown. The latch circuits 33A, 33B latch the association result signal 19A, 19B in each cache operation cycle to judge a cache miss, a way prediction hit, and a way prediction miss on the basis of the latched association result signals 19A, 19B and the way prediction signal 22. Specifically, the history update controlling part 34 generates history update data 26, and the replacement control part 35 has a logic for deciding a cache line to be replaced according to an LRU (Least Recently Used) or random algorithm, for example.

Figure 4:
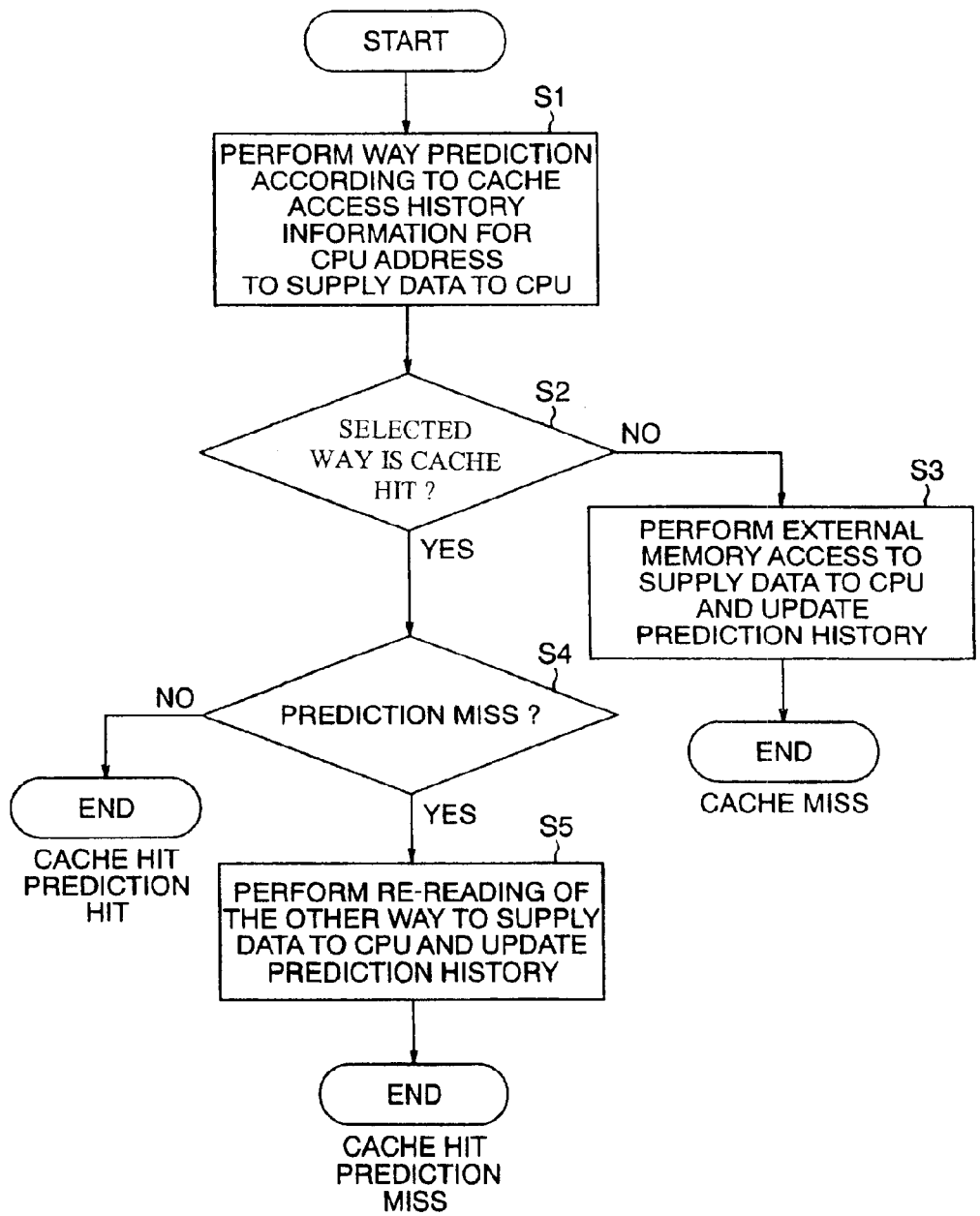
FIG. 4 is a flowchart illustrating the contents of control executed by the cache control part.

In FIG. 4, the contents of control by the cache control part 12 are shown in the form of a flowchart. When the CPU 1 instruct an access, the index operation is performed for the date array and the address array based on the address signal supplied from the CPU 1, and data of the indexed cache line is selected by the way predicted signal 22 and returned to the CPU 1 (step S1). In parallel with this operation, tag information on each way is read out from the indexed cache line in the address array, and compared with the tag address information on the address signal to generate the association result signal 19A or 19B on a way basis. It is then judged on the basis of the association result signal 19A or 19B whether the data is a cache hit (step S2). If it is a cache miss, an external memory access is performed as a penalty cycle for cache replacement and the accessed data is supplied to the CPU 1 while replacing the data according to the algorithm such as the LRU or the like so that the data will be stored in the data array. The history information is also updated in response to this replacement, and the way determining information for the subsequent access address is obtained in parallel to the penalty cycle of the cache miss (step S3). If it is a cache hit, it is then judged whether it is a prediction miss (step S4). If not the prediction miss, the processing performed in response to the access instruction from the CPU 1 is completed. If it is the prediction miss, other ways are read out again to execute the penalty cycle given to the CPU 1 so that prediction information will also be updated with the execution of the penalty cycle. Then, the way determining information related to the next access address is obtained in parallel with the penalty cycle (step S5). It is desirable to update the prediction information, if possible (if there is enough processing time), according to the way determining information obtained. Even though it is not updated, no prediction miss for the next access will occur.

When the way determining information is obtained in step S3 or S5, way selection using the way determining information instead of the prediction information is performed in step S1 for the subsequent access. In this case, the result always becomes a cache hit. Therefore, if the way selection using the way determining information is performed, a sequence of processing from step S2 may be omitted.

FIG. 5 illustrates an operational timing chart of a cache memory, which has the way prediction function but does not have the way selection determining function. Suppose here that five-time read accesses have been made from the CPU. Suppose further that although all the read data requested by the CPU exist on a way (W1), the history information is in such a state as to predict a way 0 (W0). In FIG. 5, the row of the "CPU address" indicates effective addresses R1, R2, R3, R4 and R5 issued from the CPU, representing five kinds of access addresses. The row of the "address array access" indicates for what address the access to the address array of the cache memory is made from the CPU. The row of the "data access" indicates for what address the access to the data array of the cache memory is made from the CPU. The row of the "history information of predicted way" describes what way predicted by the way prediction signal (22) based on what the hit-way history information instructs to select, where the way 0 and the way 1 is abbreviated as W0 and W1, respectively. The row of the "way selected" describes what way the cache control part instructs to select in an actual situation via associative operation. The row of the "location of the CPU requesting data" indicates the location of each access data requested by the CPU. The row of the "CPU receiving data" indicates what way the data selected by the way selector and forwarded to the CPU belongs to. The data may be supplied from the external memory. The row of the "access state" indicates whether each access from the CPU is a prediction miss, prediction hit or cache miss. The row of the "external memory access" indicates in what cycle the external memory access is performed in the case of the cache miss. In the example of Fig. 5, the 5-time read accesses are all assumed as the prediction miss. As shown, R1 is found to be the prediction miss at time 1, and the access of R1 is completed at time 3. Then, R2 is found to be the prediction miss at time 4, and the access of R2 is completed at time 6. The following processing is performed in the same manner. In the case of FIG. 5, even when consecutive way prediction misses occur, the read access processing is completed every three cycles.

FIG. 6 illustrates an operational timing chart in such a case where the data processor 4 uses the prediction determining information 23. Suppose in this example of operation that five-time read accesses have been made from the CPU. Suppose further that although all the read data requested by the CPU exist on a way (W1), the history information is in such a state as to predict a way 0 (W0). In FIG. 6, an address access to R2 is performed at time 2 during a penalty cycle in which R1 from the CPU 1 is a prediction miss, and hit information for each way is stored in the cache control part 12, which makes it possible to select W1 in which a correct requesting data exists in the way selection process despite the fact that the history information prediction way is in W0 at time 4. It should be noted that since the address access at time 4 is not always necessary, it is described as (R2) in FIG. 6. Processing from time 5 to time 8 is performed in the same manner. Thus, even when consecutive way prediction misses occur, subsequent read access processing can be completed in one cycle in the same manner as in the case where the access is a prediction hit.

FIG. 7 illustrates another operational timing chart of the cache memory, which has the way prediction function but does not have the way selection determining function. It is assumed in this example that four-time read accesses have been made from the CPU, where R1 indicates a cache miss, R2 is a prediction miss, R3 is a cache miss and R4 is a prediction miss. In this case, R1 is found to be the cache miss at time 1, and an external memory access is issued at time 2. Although corresponding data depends on the specifications of the external memory, since it is assumed to be supplied to the CPU at time 5, the processing for R1 is completed at time 5. Then, R2 is found to be the prediction miss at time 6, and the access to R2 is completed at time 8. After that, R3 is found to be the cache miss at time 9, and an external memory access is issued at time 10. Corresponding data is supplied to the CPU at time 13 and the processing for R1 is completed. Then, R4 is found to be the prediction miss at time 14. In other words, processing for responding the subsequent access request is performed after the completion of the penalty processing for the cache miss at time 5. When the subsequent access is the prediction miss, a further penalty cycle related to the prediction miss is added this time.

FIG. 8 illustrates another operational timing chart in such a case where the data processor 4 uses the prediction determining information 23. Like in the example of FIG. 7, it is assumed in this example that four-time read accesses have been made from the CPU, where R1 indicates a prediction miss, R2 is a cache miss, R3 is a prediction miss and R4 is cache miss. In FIG. 8, an address array access to R2 is performed at time 2 during a penalty cycle in which R1 from the CPU 1 is the cache miss, so that way hit information for R2 can be determined or confirmed. The way hit information is stored in the cache control part 12, which makes it possible to select W1, in which a correct requesting data exists, at time 6 after completion of the external memory access to R1 at time 5, despite the fact that the history information prediction way is in W0. Thus, even when the cache miss access and the way prediction miss occur consecutively, subsequent read access processing can be completed in one cycle in the same manner as in the case where the access is a prediction hit.

FIG. 9 illustrates still another operational timing chart of the cache memory, which has the way prediction function but does not have the way selection determining function. It is assumed in this example that four-time read accesses have been made from the CPU, where R1 indicates a prediction miss, R2 is a cache miss, R3 is a prediction miss and R4 is cache miss. In this case, R1 is found to be the prediction miss at time 1 and the access to R1 is completed at time 3. After that, R2 is found to be the cache miss at time 4, and an external memory access is issued at time 5. Corresponding data is supplied to the CPU at time 8 and the processing for R2 is completed. Then R3 is found to be the prediction miss at time 9 and the access to R3 is completed at time 11. After that, R4 is found to be the cache miss at time 12, the external memory access is issued at time 13. In other words, the penalty cycle of the prediction miss and the penalty cycle of the cache miss are performed completely in series.

FIG. 10 illustrates still another operational timing chart in the data processor 4. Like in the example of FIG. 9, it is assumed that four-time read accesses have been made from the CPU, where R1 indicates a prediction miss, R2 is a cache miss, R3 is a prediction miss, and R4 is a cache miss. In FIG. 10, an access to R2 is performed at time 2 during a penalty cycle in which R1 from the CPU 1 is a prediction miss to know that the access to R2 is the cache miss, which makes it possible to issue an external memory access to R2 at time 3. Therefore, data for R2 can be supplied to the CPU 1 at time 6 two cycles earlier than that in FIG. 9 and the processing for R2 is completed as well as the completion of the external memory access to R1 as the prediction miss at time 3. After that, an address access to R4 is performed at time 8 during a penalty cycle caused by the fact that R3 became the prediction miss at time 7 to know that the access to R4 is the cache miss, which makes it possible to issue the external memory access to R4 at time 9. Thus, even when the prediction miss access and the cache miss access occur consecutively, a waiting cycle for the subsequent read access can be shortened.

Figure 11:
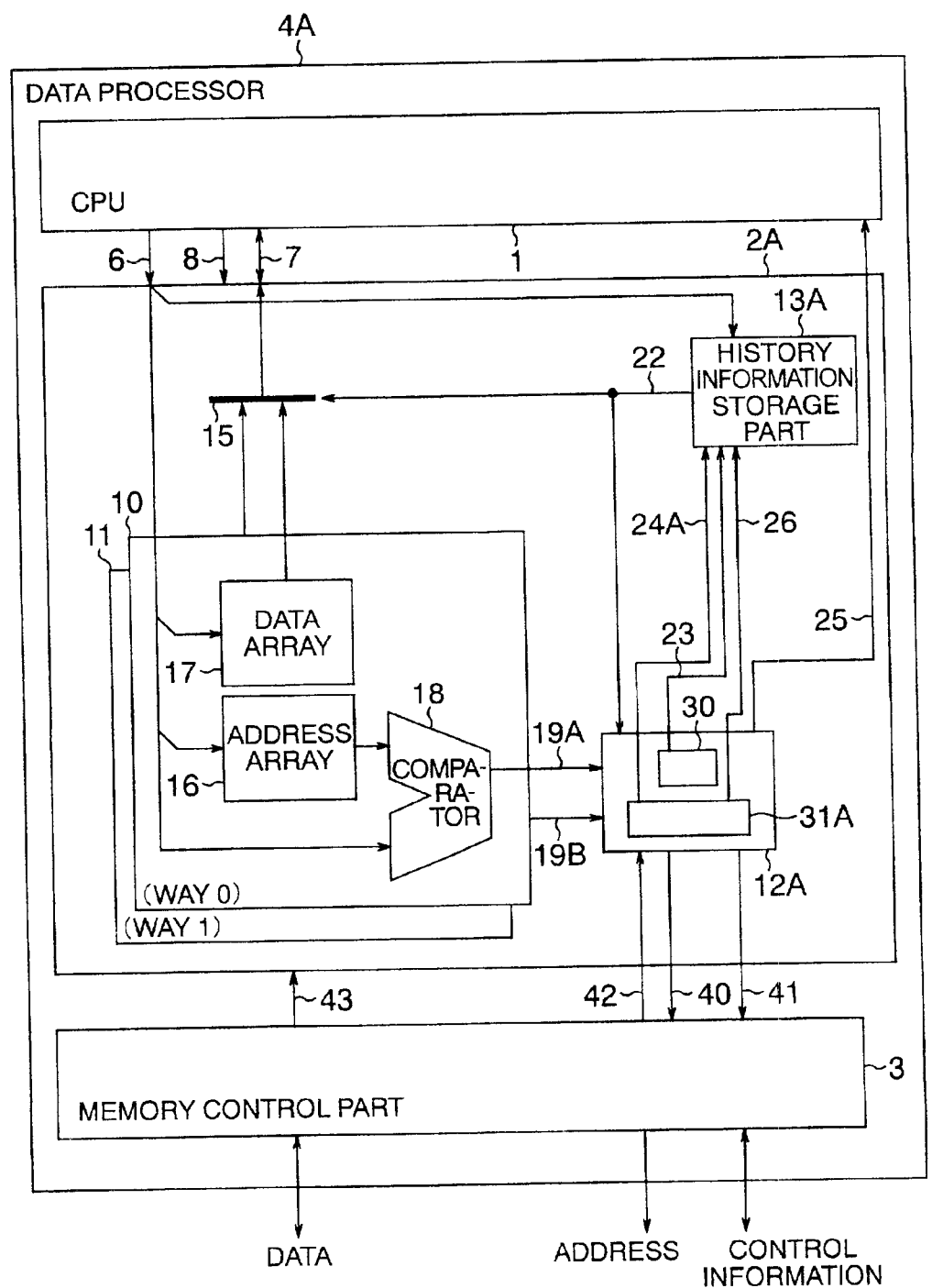
FIG. 11 is a block diagram showing another example of a data processor according to the invention.
Figure 12:
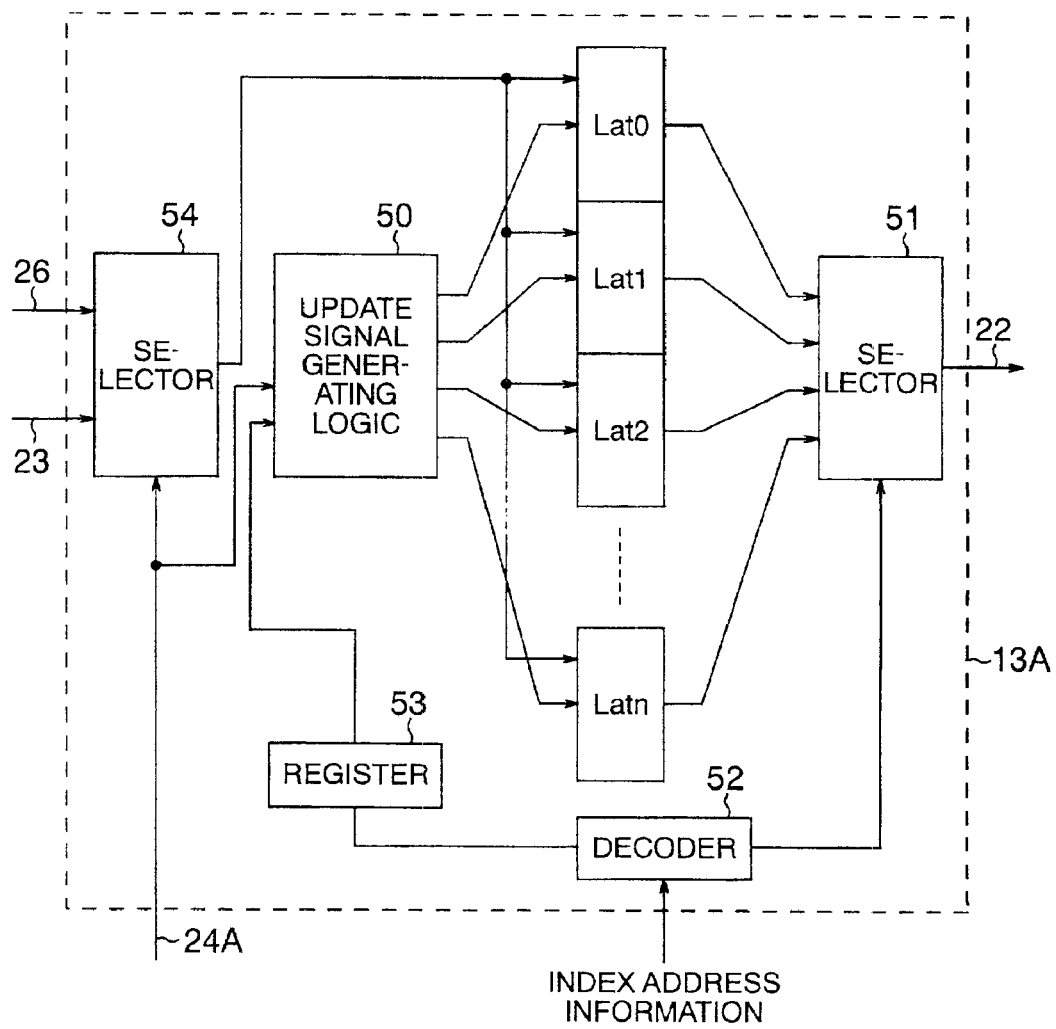
FIG. 12 is a block diagram illustrating a schematic configuration of a history information storage part in the data processor of FIG. 11.

FIG. 11 shows another example of a data processor according to the present invention. A data processor as shown is different in usage pattern of the way selection determining information 23 from that shown in FIG. 1. Although in FIG. 1 the selector 14 selects the way selection determining information 23 instead of the way prediction signal, the way selection determining information 23 in FIG. 11 is used to rewrite corresponding history information. As illustrated in FIG. 12, a selector 54 selects the way selection determining information 23, where an index address latched in a register is used as storage destination of the selected way determination information. Writing timing (latch timing) of the way selection determining information 23 through the selector 54 is defined by a control signal 24A. The control signal 24A is assumed to be an operation cycle following an operation cycle in which a prediction or cache miss occurs. Therefore, it is necessary to generate the way selection determining information 23 securely in the cycle following the operation cycle in which the prediction or cache miss occurs.

Figure 13:
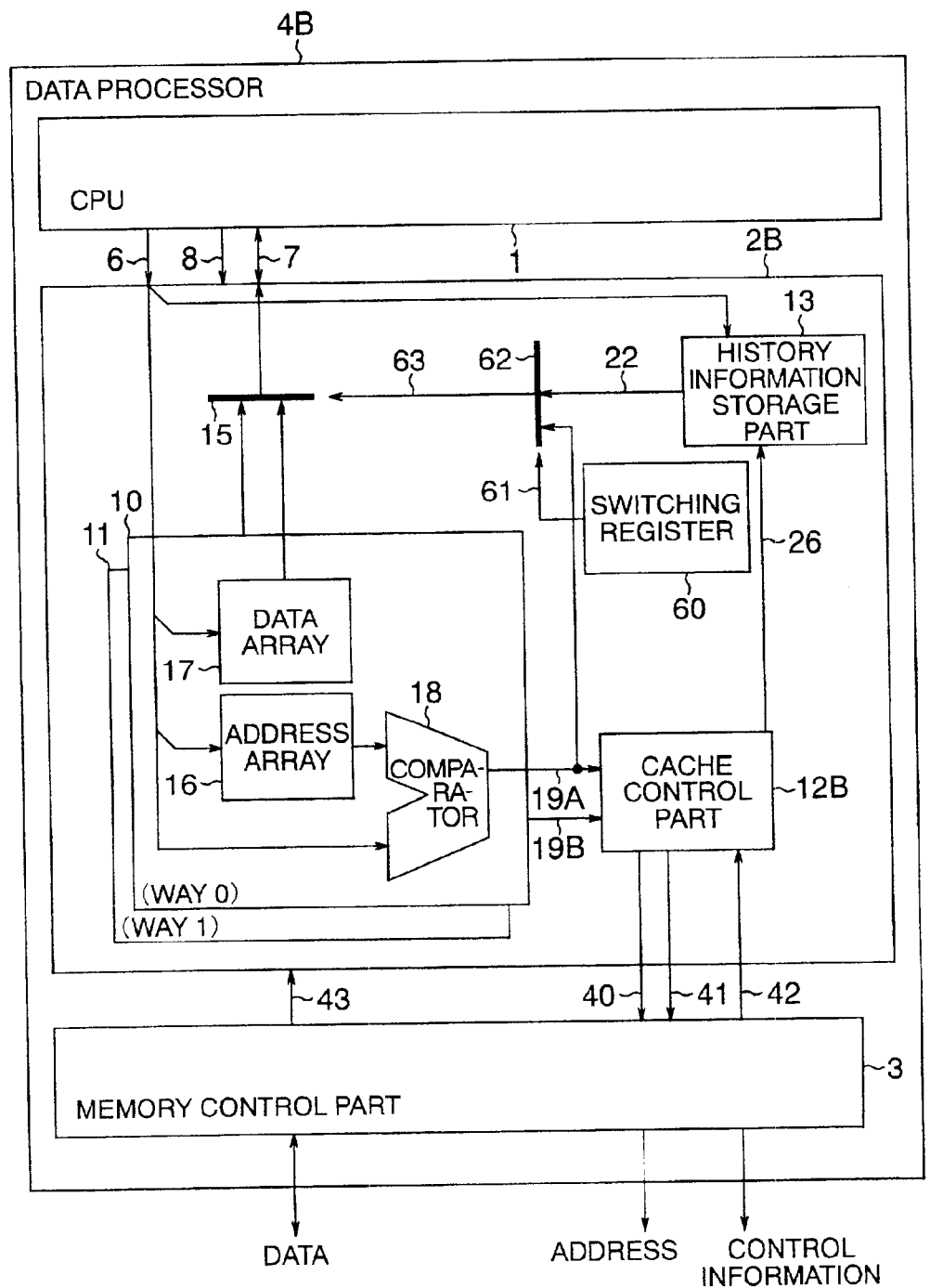
FIG. 13 is a block diagram showing still another example of a data processor according to the invention.

FIG. 13 shows still another example of a data processor according to the present invention. A data processor 4B as shown includes a switching register 60 in a cache part 2B. The switching register 60 outputs a selection signal 61 for a switching selector 62 for outputting a way select signal 63 to the way selector 15. When the selector 62 selects a hit signal 19A from the comparator 18 by means of the switching register 60, the data processing device 4B is operated by the set associative method. When the selector 62 selects the way prediction signal 22 generated from the history information storage part 13 by means of the switch register 60, the data processing device 4B is operated by the way-predictive set-associative method.

After setting upon startup (reset) of the processor, the contents of the register 60 may be kept at fixed values, or they may be accessible by the CPU so that they will be dynamically rewritable by a program.

The register 60 is positioned as instruction means for switchably instructing either of a first operation mode for performing the way selection according to the result of the associative operation and a second operation mode for performing the way selection based on the prediction in parallel with the associative operation.

In this case, when re-reading is carried out after occurrence of a way prediction miss, the history information storage part 13 is updated by the history update signal 26 without using the way determination signal 23 described in FIG. 1. The other components are the same as those in FIG. 1, and detailed description thereof is omitted here.

The data processor described above displays the following operation and effects.

From the viewpoint of access time related to the cache access, that is, of operation speed, since the way-predictive set-associative method does not need to select data read out by the hit signal from the data array, it can perform the same high-speed operation as the direct mapping method, compared to the normal set associative method. From the viewpoint of power consumption, while the set associative method needs to read out all the candidate data from the data array, the way-predictive set-associative method has only to read out the data from the way whose operation is predicted. Therefore, the memory operation to the ways other than the prediction target essentially becomes unnecessary, which makes it possible to achieve power savings. In the description based on the accompanying drawings, this point was not mentioned, but the selection control signal for the selector 15 may be utilized as a memory enable signal for the data array 17 and the address array 16, which makes possible control for operating only the data array 17 and the address array 16 to be predicted.

The number of penalty cycles caused by way prediction misses, which is a weak point in performance of the way-predictive set-associative method, compared to the set associative method, can be reduced by about one-half in the configuration typified in FIG. 1. In other words, when consecutive memory accesses are processed, a way to be hit at the subsequent cache access can be predetermined in a penalty cycle during a sequence of processing for the first access, which makes it possible to achieve cache performance extremely close to that of the set associative method. In the worst case where way prediction misses occur to all the consecutive memory accesses, each memory access will need extra two cycles as penalty cycles unless the technique according to the present invention is used. On the other hand, if the configuration typified in FIG. 1 is adopted, the penalty cycles will be caused only alternately, which reduces the average number of penalty cycles to one cycle.

As described in FIG. 13, if the set associative method and the way-predictive set-associative method are made switchable by means of the switching register 60, a mode for operating in the way-predictive set-associative method will be used in both cases where high-speed operation is required and low-power operation is required, while a mode for operating in the set associative method will be used in a case where a penalty cycle caused by a way prediction miss should be avoided.

As mentioned above, the invention by the inventors was described in detail based on the embodiments, but it is not limited thereto. It should be recognized that various modifications are possible within the scope of the invention.

For example, the number of ways in the cache memory may be more than two. In addition, the cache memory may operate at either of a logical address and a physical address. In the data processor, an address conversion buffer unit such as a memory management unit may be arranged between the cache control part and the memory part. Further, the on-chip modules of the data processor are not limited to the above-mentioned examples, and other peripheral circuits such as a timer and a serial interface may be provided. Furthermore, the way selection based on the prediction is not limited to the selection of read-out data from a way, and it may be replaced with the selection of a way to be accessed or the selection of a way to be memory-enabled.

Furthermore, although the above description was made mostly about cases where way prediction misses occur to consecutive read accesses, the present invention is applied to the write accesses as well. When prediction misses occur to write accesses, data recovery operation should be carried out in each penalty cycle such as to rewrite the data. Using this period, the way selection determining information can be determined for the access operation after the penalty cycle in the same manner to use the determination information instead of the prediction information, which can also reduce the occurrence of consecutive prediction or cache misses in the case of write accesses in the same manner as described above for the case of consecutive read accesses.

The following is brief description about the effects obtained from the representative of the present invention.

When the prediction misses occurs consecutively, or the cache miss and the prediction miss occur before and after each other, a way to be hit at the subsequent cache access can be predetermined during the preceding penalty cycle, which makes it possible to reduce the cumulative number of penalty cycles, and hence contribute to an improvement in data processing performance or data processing speed of the CPU or the like.

Further, the use of the switching function of the switching register for switching the set associative method and the way-predictive set-associative method enables switching between the use of the mode for operating in the way-predictive set-associative method in both cases where high-speed operation is required and low-power operation is required, and the use of the mode for operating in the set associative method in a case where a penalty cycle caused by a way prediction miss should be avoided.

What is claimed is:

1. A data processing device including a set-associative cache memory capable of performing associative operation by sequentially comparing tag information contained in an access address signal with tag information contained in each of ways of a cache line which is selected as an information storage area with lower bits of the access address signal, said cache memory comprising:

way prediction means for predicting one of the ways of the cache line as a matching way in parallel with the associative operation;

generation means for generating way selection determining information based on the associative operation using a subsequent access address signal during a penalty cycle which is caused by a prediction miss of said way prediction means; and control means selecting one of the ways of a cache line, which is selected as an information storage area with lower bits of the subsequent access address signal, as a machine way for the subsequent access address signal after the penalty cycle using the way selection determining information.

2. The data processing device according to claim 1, wherein said control means selects the matching way for the subsequent access address signal using the way selection determining information instead of prediction by said way prediction means.

3. The data processing device according to claim 1, wherein said control means controls rewriting of prediction result information obtained by said way prediction means and corresponding said prediction result information to the way selection determining information.

4. The data processing device according to claim 1, wherein the associative operation generates an association result signal which indicates an association hit or association miss on a way basis.

5. The data processing device according to claim 1, wherein the said way prediction means determines according to way selection history information the least previously selected one of the ways as a matching way for each cache line.

6. A data processing device including a set-associative cache memory capable of performing associative operation by sequentially comparing tag information contained in an access address signal with tag information contained in each of ways of a cache line which is selected as an information storage area with lower bits of the access address signal, said cache memory comprising:

instruction means for switchably instructing either of a first operation mode for selecting a matching one of ways of a cache line according to a result of the associative operation and a second operation mode for predicting a matching one of ways of a cache line based on prediction conducted in parallel with the associative operation.

7. The data processing device according to claim 6, further comprising a CPU connected to said cache memory, wherein said instruction means is register means accessible by said CPU.

8. A data processor including a set-associative cache memory capable of performing associative operation by sequentially comparing tag information contained in an access address signal with tag information contained in each of ways of a cache line which is selected as an information storage area with lower bits of the access address signal, and a CPU connected to the cache memory, said cache memory comprising a plurality of way and cache control means, wherein;

said cache control means predicts one of the ways of the cache line as a matching way in parallel with the associative operation in response to the access operation of said CPU, generates way selection determining information based on the associative operation using a subsequent access address signal during a penalty cycle caused by a prediction miss or cache miss, in which a predicted matching way does not match a result of the associative operation, on the basis of the associative operation using the subsequent access address, and selects one of the ways of a cache line, which is selected as an information storage area with lower bits of the subsequent access address signal, as a matching way for the subsequent access address signal after the penalty cycle using the way selection determining information.

9. The data processor according to claim 8, wherein said control means selects the matching way for the subsequent access address signal using the way selection determining information instead of the prediction by said way prediction means.

10. The data processor according to claim 8, wherein said control means controls rewriting of prediction result information obtained by said way prediction means and corresponding said prediction result information to the way selection determining information.

11. The data processor according to claim 8, wherein said cache control means issues an external memory access signal during the penalty cycle caused by the prediction miss.

12. The data processor according to claim 8, wherein said cache control means includes storage means for staring way selection history information on a cache line basis, and the history information is used for predicting a way corresponding to the least recently accessed information as a matching way.

13. The data processor according to claim 8, wherein said cache control means includes storage means for storing way selection history information on a cache line basis and updates the history information to provide the latest access way of the cache line to be predicted as a matching way later.

14. The data processor according to claim 8, wherein said cache control means includes storage means for storing way selection history information on a cache line basis and reads out the history information from said storage means according to the lower bits of the access address signal to predict a matching way using the read-out history information.

15. The data processor according to claim 8, wherein said cache control means judges, from the tag information contained in ways of the cache line, whether a cache miss or prediction miss occurs, reselects a matching way in response to a judgment that a cache hit or prediction miss occurred while updating history information corresponding to the cache line, and instructs an external access in response to the judgment result so as to replace the cache line while updating the history information corresponding to the cache line.

16. The data processor according to claim 8, wherein said data processor is formed on a semiconductor chip.

\* \* \* \* \*